3,105,082
SYNTHESIS OF AMINO ACIDS

Harry M. Walborsky, Tallahassee, Fla., and Ethan C. Galloway and Don V. Wysong, Midland, Mich., assignors to The Dow Chemical Company, Midland, Mich., a corporation of Delaware
No Drawing. Filed Dec. 2, 1960, Ser. No. 73,186
5 Claims. (Cl. 260—349)

This invention relates to processes for the production of amino acids, particularly threonine and ornithine.

Threonine, 2-amino-3-hydroxybutyric acid, is a naturally occurring amino acid which is useful as a feed and food supplement.

The usual amino acid syntheses are unsatisfactory for the production of threonine because they yield a product consisting largely or entirely of the isomeric allothreonine. The latter is not the biological equivalent of threonine and, hence, is an undesirable byproduct.

Ornithine is 2,5-diaminovaleric acid, also a naturally occurring amino acid, useful in animal nutrition. While most amino acids are readily made by the reaction of ammonia on the corresponding chloro acid, attempts to make ornithine this way yield proline and other byproducts instead.

It is an object of this invention to provide methods for the production of threonine and ornithine. A further object is to provide such methods which result in the formation of little or no allothreonine or proline. Other objects will appear hereinafter.

According to the invention, D,L-threonine, containing at most, only minor amounts of allothreonine, is produced by the hydrogenolysis of certain 2-azido-3-alkoxybutyric esters and hydrolysis of the resulting 2-amino-3-alkoxybutyric esters. These reactions may be represented as follows:

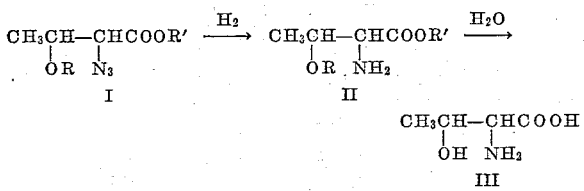

wherein R is a lower alkyl radical, and R' is a primary or secondary alkyl or cycloalkyl radical containing 2 to about 6 carbon atoms.

The azido-ester (I) may be obtained by reacting sodium or potassium azide with the corresponding 2-halo-ester. The latter may be prepared by the reaction of the 2-halo-3-alkoxy-acyl halide with the alcohol R'OH.

Similarly, ornithine is made in accordance with the invention by an analogous series of steps:

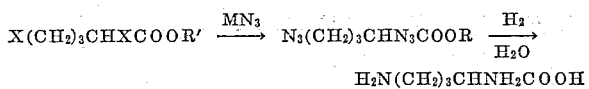

wherein R' has the same significance as above and M is an alkali metal and X is a halogen.

The practice of the invention is illustrated by the following examples.

*Example 1.—Preparation of Isobutyl 2-Bromo-3-Methoxybutyrate*

Isobutyl alcohol (372.0 g., 5.0 moles) and pyridine (80 g., 1.0 mole) were combined in a 1-liter 3-neck flask equipped with mechanical stirrer, dropping funnel and thermometer. This solution was cooled to 10° C. and 2-bromo-3-methoxybutyryl chloride was added dropwise over 2¼ hours while maintaining a temperature of 8–14° C. The solution was stirred an additional two hours at 25° C. and then concentrated in vacuo. The final slurry was filtered with suction and the filtrate washed with 50 ml. of water; then dried over anhydrous magnesium sulfate. After removal of the drying agent the product layer weighed 217 g., corresponding to an 86% yield. Analysis of this material for bromide indicated 99% purity.

*Example 2.—Preparation of Isobutyl 2-Azido-3-Methoxybutyrate*

In a 500 ml. 3-neck flask equipped with mechanical stirrer, reflux condenser and thermometer, isobutyl 2-bromo-3-methoxybutyrate (25.3 g., 0.1 mole), sodium azide (13.0 g., 0.2 mole) and 200 ml. of dimethyl sulfoxide were placed. Warming this mixture to 75° C. gave complete solution and after an additional 40 minutes at this temperature the reaction was complete, as measured by titration for inorganic bromide. The reaction mixture was flooded with 500 ml. of ice and water and extracted with two 50 ml. portions of methylene chloride. The extracts were washed with 50 ml. of water, dried over anhydrous magnesium sulfate and distilled to give an 81% yield of isobutyl 2-azido-3-methoxybutyrate boiling at about 88–92° C./2 mm.

*Example 3.—Preparation of Isobutyl 2-Amino-3-Methoxybutyrate*

Distilled isobutyl 2-azido-3-methoxybutyrate (10.8 g., 0.05 mole) was dissolved in 50 ml. of ethyl alcohol and 1.5 g. of 5% palladized carbon slurried in 10 ml. of water was added. This mixture was charged to a Parr bottle and shaken at 25° C. under 50 lbs. per sq. in. of hydrogen for 6 hours. During this period the bottle was evacuated and charged with fresh hydrogen several times. Catalyst was filtered off and washed with 95% ethyl alcohol. Concentration of the filtrate and wash gave 8.8 g. of oil; crude yield of isobutyl 2-amino-3-methoxybutyrate, 93%.

*Example 4.—Preparation of 2-Amino-3-Hydroxybutyric Acid Threonine*

The product of Example 3 was hydrolyzed by refluxing with 50 ml. of 48% hydrobromic acid for about 20 hours. The hydrolysate was concentrated in vacuo to dryness, combined with 150 ml. water and concentrated again. The oily residue was dissolved in 50 ml. of hot water and the orange solution was decolorized with Darco and then poured onto a column of 0.25 mole of Dowex-50 cation exchange resin (acid form) and washed free of bromide. Threonine was liberated from the column with 650 ml. of 3–4 N ammonium hydroxide followed by 500 ml. of water wash. Concentrating the eluate and wash gave 5.0 g. of crude threonine. Recrystallization from alcohol-water gave an 86% recovery in a single crop. This material was 97% D,L-threonine and 3% D,L-allothreonine according to infrared analysis and represented a 35% yield from the crotonic acid used in making the 2-bromo-3-methoxybutyryl chloride.

*Example 5.—Preparation of Threonine from Ethyl 2-Bromo-3-Methoxybutyrate*

Ethyl 2-bromo-3-methoxybutyrate was prepared by the method of Example 1 in yields averaging 80%. This ester (33.7 g., 0.15 mole) was charged into a 450 ml. stainless steel bomb with 13.6 g. (0.21 mole) of sodium azide, 36 ml. of ethyl alcohol and 90 ml. of water. The bomb was heated at 100–110° C. for 16 hours with rocking. The reaction mixture was concentrated and extracted with several portions of ether. These were dried over anhydrous magnesium sulfate and concentrated in vacuo to 23 g. of residue.

An 18.7 g. (0.10 mole) portion of the residue was mixed with 50 ml. of ethyl alcohol, 10 ml. of water and 1.5 g. of 5% palladized carbon in a citrate bottle. The bottle was placed on a Burgess-Parr hydrogenating apparatus, pressured with 50 lbs. of hydrogen and shaken for 19 hours at 30° C. After removing the catalyst by filtration, the filtrate was concentrated to dryness under reduced pressure and the residue put into solution with water, treated with Darco, and filtered.

After concentrating the filtrate to dryness, the residue was dissolved in fresh water and poured onto a column containing 0.5 mole of Dowex-50 resin (acid form). The amino acid was removed from the resin by eluting with 1 liter of 10% ammonium hydroxide and the eluates concentrated under reduced pressure to 8 g. of solids. These were put into solution with 32 ml. of water at 90–100° C. and ethyl alcohol (160 ml.) added. After thorough cooling, the solids were collected by vacuum filtration. Dry weight, 7 g., for a yield of 59%. This was 87% D,L-threonine and 13% D,L-allothreonine according to infrared analysis.

*Example 6.—Preparation of Methyl 2,5-Diazidovalerate*

Methyl 2,5-dichlorovalerate (9.40 g., 0.05 mole) was added to a mixture of 50 ml. of dimethyl sulfoxide and 13.0 g. (0.20 mole) of sodium azide and stirred for 5 hours at 60–65° C. and then at room temperature for 12 hours. Water was added and the orange solution was extracted three times with ether. The combined ether extract was washed with water and the titration of the total aqueous portion showed the liberation of 97.5% of the theoretical amount of inorganic chloride. The ether solution was dried and evaporated under reduced pressure to yield methyl 2,5-diazidovalerate, a bright yellow liquid.

*Example 7.—Preparation of Ornithine Hydrochloride*

The product of Example 6 was taken up in 50 ml. of 95% ethanol and transferred to an atmosphereic pressure reduction flask. 5% palladium on charcoal (1 g.) was added and hydrogen was bubbled in with stirring for 1.5 hours at 0–5° C. and then for 5 hours at room temperature after adding 8 ml. of conc. HCl. The catalyst was filtered, the solution evaporated, refluxed with 40 ml. of 5 N HCl for 4 hours, and then passed through a column containing 70 g. of Dowex-50-H+ (the acid form of a strong acid ion-exchange resin made by The Dow Chemical Company). The aqueous ammonia eluate was collected and evaporated to leave an oil which was acidified to pH 3.8 with HCl and evaporated. Trituration with ethanol yielded 5.28 g. (63% of theory) of ornithine hydrochloride.

The methyl esters are unsuitable for use in the above threonine synthesis because of the large proportion of allothreonine produced thereby. The other alkyl or cycloalkyl esters wherein the alkyl or cycloalkyl group contains up to 6 or more carbon atoms may be used, however. The secondary alkyl esters are preferred because of their ease of preparation and high specificity for the production of threonine rather than allothreonine. The isopropyl, sec.-butyl, sec.-amyl and cyclohexyl esters are particularly suitable.

The solvents and diluents used in the above examples are not critical, it being sufficient that the solvent dissolve the reactants and be itself inert under the conditions of the reaction. In the conversion of the halo-ester to the azido-ester most of the common solvents are unsuitable because the reactants are not soluble therein. Suitable solvents for this step include dimethyl sulfoxide, dimethyl formamide, ethylene glycol and aqueous alcohol.

Instead of the sodium azide used in the above examples, other alkali metal azides may be used, particularly potassium or lithium azide. While only one molar equivalent is required in the process, it is usually advantageous to use somewhat more in order to obtain the highest yield and conversion to the desired product.

The temperature at which the halo-ester is converted to the azido-ester should be between about 20° and 140° C. Below 20° the reaction is impractically slow while above 140° there is some loss of product through racemization or decomposition. The generally preferred range is about 60–100°.

While the 3-methoxy-esters are preferred for use in the threonine process of the invention because of their ease of preparation and high reactivity, other lower alkoxy-esters, such as the ethoxy-, propoxy-, isopropoxy-, sec.-butoxy- and 3-pentoxy-esters may be used. The terms "lower alkyl" and "lower alkoxy" as used herein refers to such groups containing 1 to 6 carbon atoms.

In the hydrogenation step of the invention, the preferred catalysts are palladium and platinum, though nickel and other conventional catalysts may be used. The temperature and hydrogen pressure may be varied widely it being only necessary to operate under conditions sufficiently vigorous to convert the azido group to an amino group but not so vigorous as to reduce the ester group. Since the reactivities of these two groups differ widely, it is a simple matter to find the required intermediate conditions. When platinum or palladium catalyst is used, it is usually preferred to conduct the hydrogenation at a temperature of about 20–50° C. and a hydrogen pressure of about 1–4 atm. When using less active catalysts, higher temperatures and/or pressures are preferred.

In the step of hydrolyzing the amino-ester, the latter may be heated with an aqueous solution of any strong mineral acid, such as hydrochloric or sulfuric acid. The threonine or ornithine salt thus formed may be recovered as such or the free amino acid may be obtained therefrom by any of the well known techniques for isolating amino acids from their salts.

This is a continuation-in-part of copending application Serial No. 771,972, filed November 5, 1958, now abandoned.

We claim:
1. A compound having the formula

wherein R' is a member of the group consisting of lower primary and secondary alkyls and cyclohexyl.

2. The compound having the formula

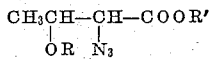

wherein R is a lower alkyl and R' is a member selected from the group consisting of cyclohexyl and lower primary and secondary alkyls of 2 to about 6 carbon atoms.

3. Methyl 2,5-diazidovalerate.
4. Isobutyl 2-azido-3-methoxybutyrate.
5. Ethyl 2-azido-3-methoxybutyrate.

References Cited in the file of this patent

UNITED STATES PATENTS

| 2,571,755 | Pfister et al. | Oct. 16, 1951 |

FOREIGN PATENTS

| 165,623 | Australia | July 16, 1953 |
| 207,446 | Australia | Dec. 8, 1955 |

OTHER REFERENCES

Boyer et al.: "Chemical Reviews," volume 54, pages 1–11, 37–39 (1954).

Beilstein: "Handbuch der Organischen Chemie," Band II, III, Supp., pages 679, 683 (1960), citing papers published in 1949, 1941, 1940, 1947.

Fieser et al.: "Advanced Organic Chemistry," pages 277–280, 495–6 (1961), (Reinhold).